J. TURNEY.
Improvement in Apparatus for Cleaning and
Scouring Hides and Skins.
No. 131,480. Patented Sep. 17, 1872.

J. TURNEY.
Improvement in Apparatus for Cleaning and Scouring Hides and Skins.
No. 131,480. Patented Sep. 17, 1872.

J. TURNEY.
Improvement in Apparatus for Cleaning and
Scouring Hides and Skins.

No. 131,480.

4 Sheets--Sheet 3.

Patented Sep. 17, 1872.

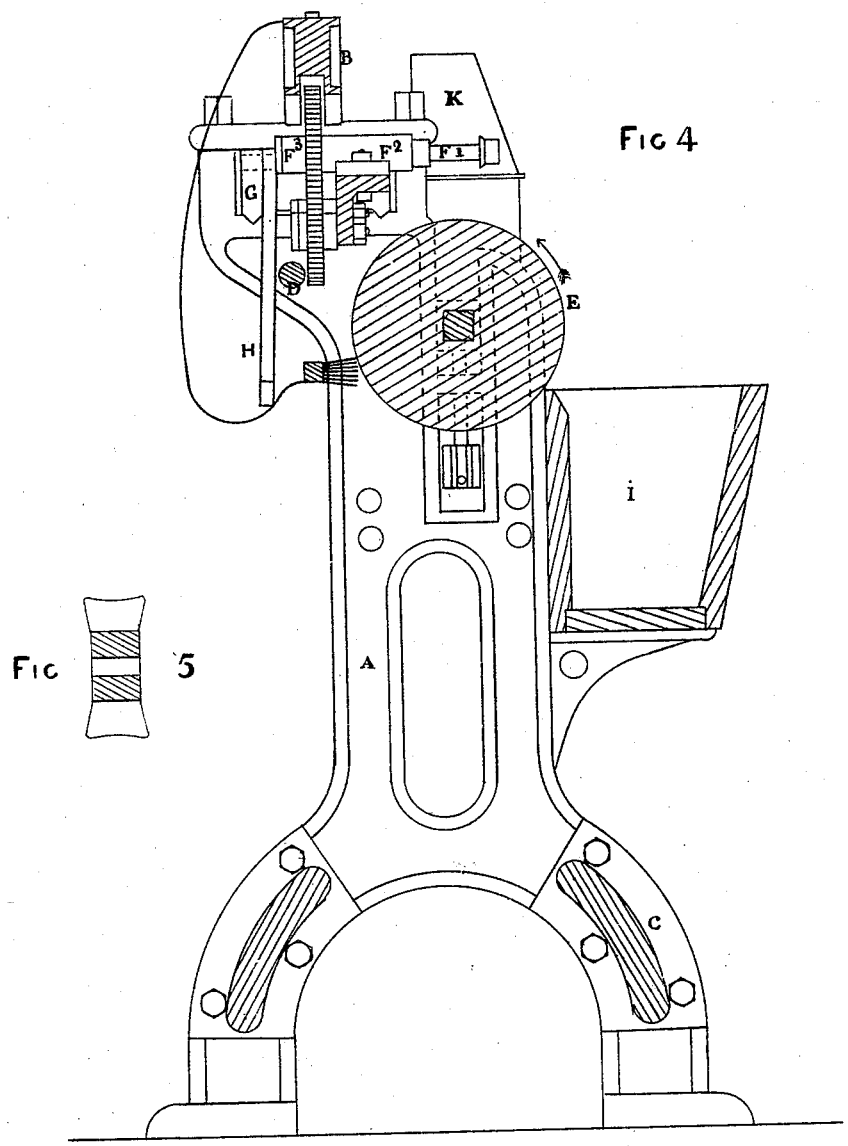

UNITED STATES PATENT OFFICE.

JOHN TURNEY, OF NOTTINGHAM, ENGLAND.

IMPROVEMENT IN APPARATUS FOR CLEANING AND SCOURING HIDES AND SKINS.

Specification forming part of Letters Patent No. 131,480, dated September 17, 1872.

*To all whom it may concern:*

Be it known that I, JOHN TURNEY, of Nottingham, England, have invented a new or Improved Machine for Scudding, Cleaning, or Scouring and Fleshing Skins, of which the following is a specification:

My invention has for its object to improve upon the machines now employed for "scudding," cleansing or scouring, and fleshing hides; and the invention consists of a drum or cylinder suitably supported and caused to revolve. Above the cylinder is a series of rotary brushes or of rotary knives, which series extends nearly the whole length of the cylinder. Half the brushes or knives revolve in one way and the other half in the other way. The axles of the brushes or knives revolve in and are carried by bearings attached to or forming part of a frame having a to-and-fro motion, the stroke or travel being of such length that the skin is brushed or scraped over the whole of its width as its length is passed under the brushes or knives by the cylinder, the skin being placed on the cylinder and spread evenly. The cylinder is capable of vertical adjustment.

Figure 1:
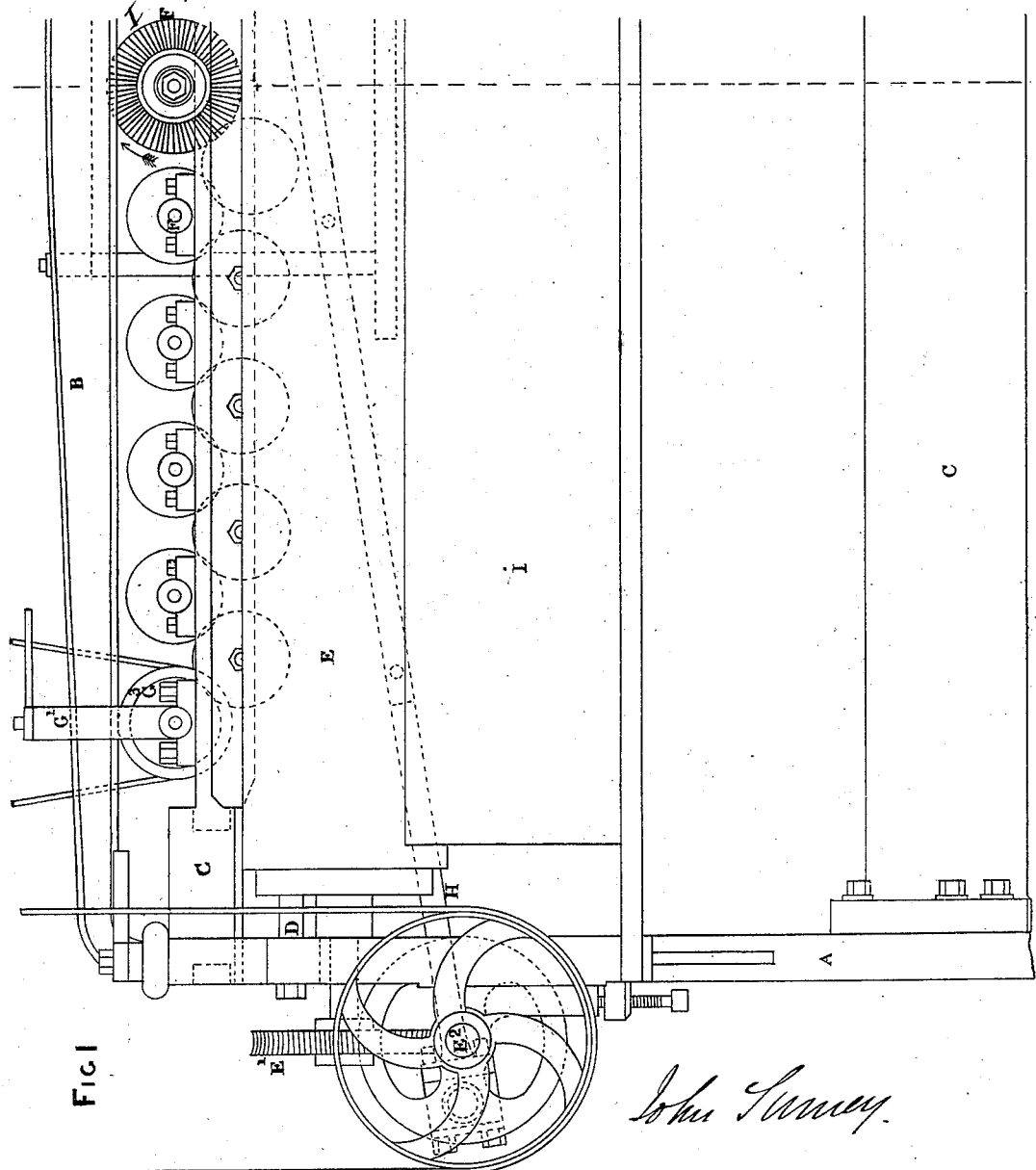
Figure 2:
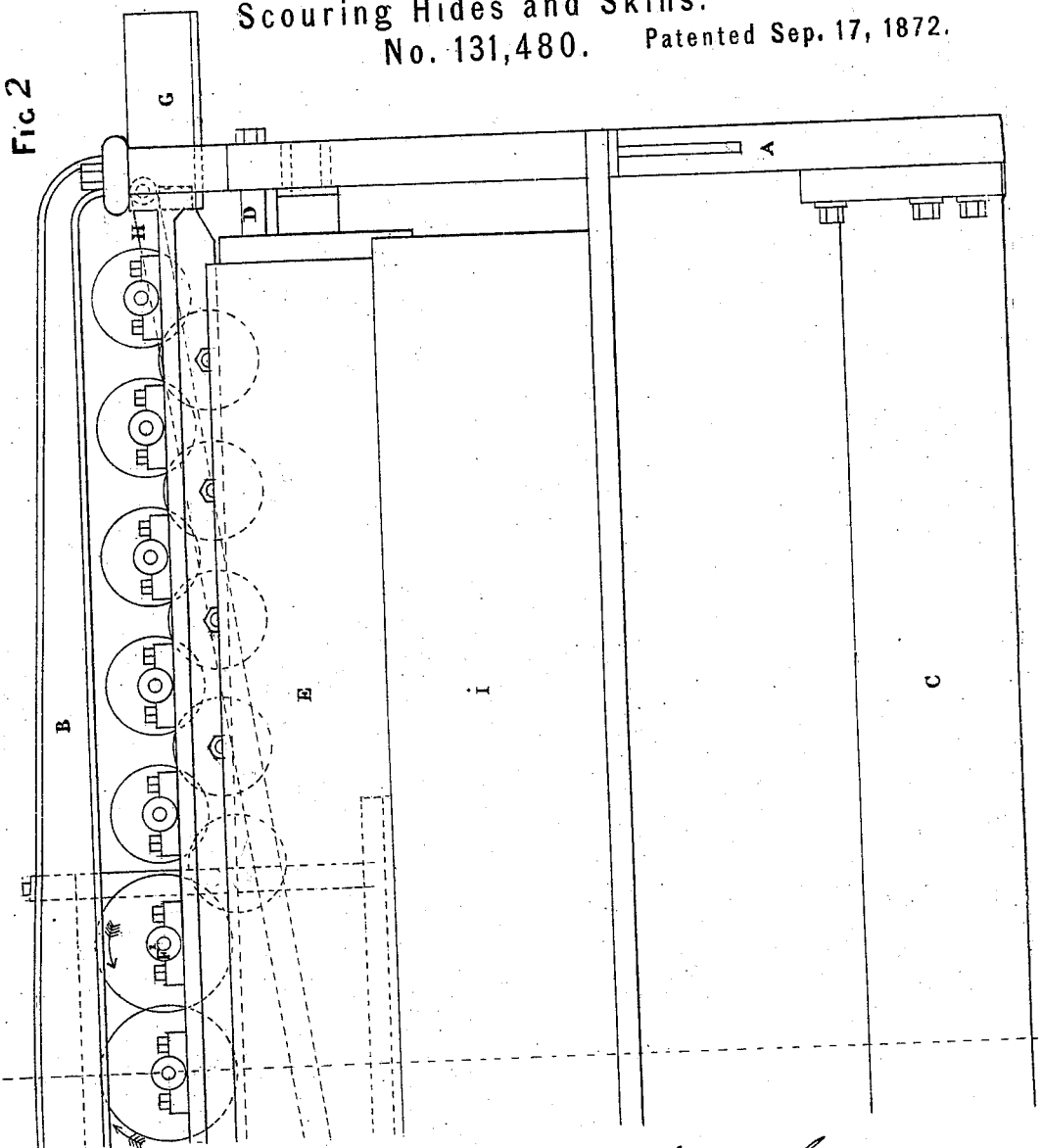
Figure 3:
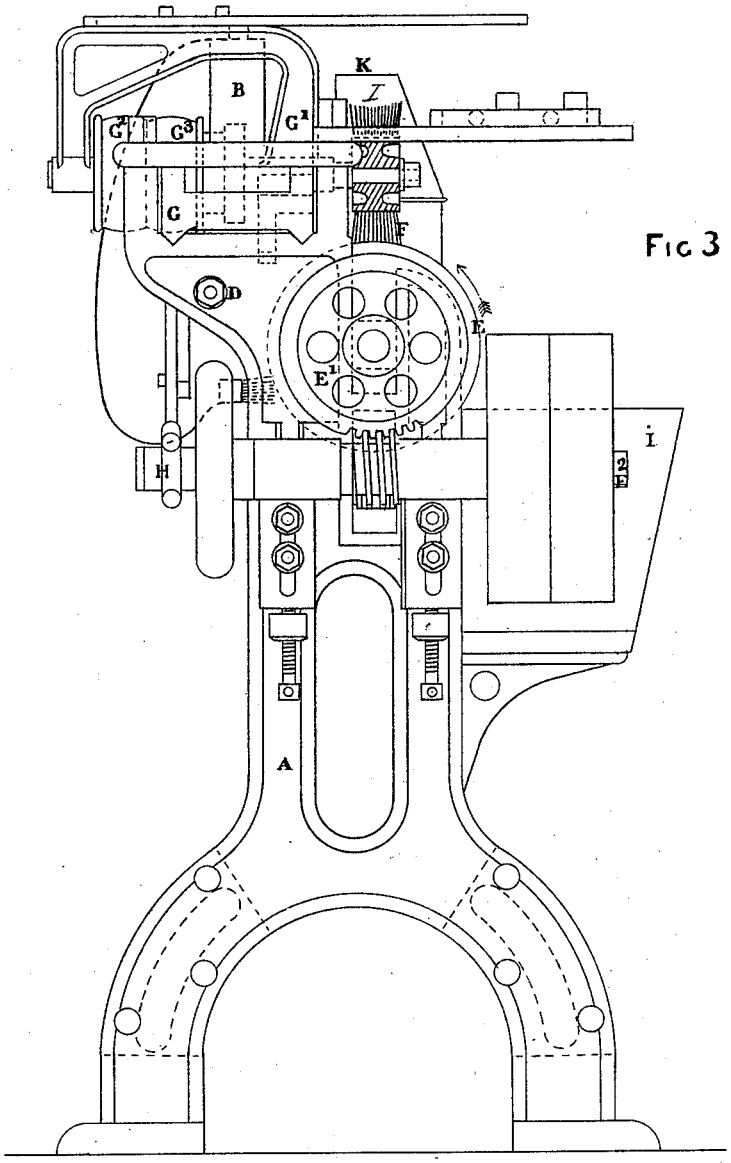

Figures 1 and 2 of the accompanying drawing represent, when placed together, a front view of a machine constructed according to my invention. Fig. 3 is a view of the left end, and Fig. 4 a sectional view through the center of the length of the machine. Fig. 5 represents, in section, one of the rotary knives.

A A, Figs. 1 and 2, are two vertical standards, connected together by a tie-bar at their upper ends, and by rails C C, Fig. 4, at their lower ends, and also by a tie-bar, D, at the back. The standards carry bearings for a drum or cylinder, E, which is caused to revolve in the direction of the arrow by means of a spur-wheel, $E^1$, secured on one end of the axle of the cylinder. The spur-wheel is moved by a worm on a short horizontal shaft, $E^2$, lying at right angles to the cylinder and supported in bearings on the outside of the left-end standard. The worm-axle is provided at the front of the machine with fast and loose pulleys, driven by a belt from any prime mover. Above the cylinder is placed a series of rotary brushes or knives, F. One such brush is shown in section in Fig. 3, and a front view at Fig. 1. These brushes or knives extend nearly the length of the cylinder, and are secured upon axles $F^1$, which revolve in and are carried by bearings $F^2$, attached to a sliding frame, G. Half the brushes or knives revolve one way and the other half the other way, in the direction of the arrows, seen at Fig. 1. They are caused thus to revolve by a series of wheels, $F^3$, gearing into each other. Twelve of these wheels are secured on the back ends of the axles of the brushes or knives. The remaining ten wheels revolve on axles secured in the sliding frame G. The axle of the brush or knife nearest the left end of the machine is somewhat longer than the others, and is carried by and revolves in bearings at the lower end of an arched bracket, $G^1$, which is attached to and slides with the frame G. This axle is provided with a loose pulley, $G^3$, and a fast pulley, $G^2$, moved by a second belt from any prime mover. The skin is spread on the cylinder E and spread evenly thereon by a workman. The sliding frame G has a to-and-fro movement communicated to it by a connecting-rod, H, attached to it and also attached to a crank at the back end of the worm-shaft $E^2$. The to-and-fro movements of the brushes or knives, or, in other words, the strokes of their to-and-fro travel, are of such length that the skin, which is placed upon the cylinder E and spread evenly upon it is brushed or scraped over the whole of its width as its length is passed under the brushes or knives by the revolving cylinder. The cylinder E is capable of adjustment vertically by means of a screw, $E^3$, in each standard, so as to compensate for the varying substance of the skins and the wear of the brushes or knives. The driving-shaft $E^2$ is capable of adjustment vertically by the screws $E^4$, to keep the worm in gear with the spur-wheel $E^1$. Each of the revolving knives, one of which is shown in section at Fig. 5, is thus formed. There is a boss perforated to receive the axle of the knife. I are blades which radiate from the boss. These blades may be formed of spring-steel plates, so as to be flexible, or they may be formed stiff. I sometimes make such blades of brass or other metal or suitable material. In front of the roller E a trough, $i$, may be placed to hold the skin or skins for the convenience of the workman. The brushes or knives may be partially inclosed by a cover or shield, K, of the same length as the roller E. It is shown only in section in Figs. 3 and 4. The object of the cover or shield is to prevent the water or other liquid which saturated the skins from being sprinkled thereon or thrown over the workman and the machine.

The machine may be applied for treating either split or unsplit skins, as above described.

Having set forth the nature of the invention, and in what manner the same may be performed, I declare that I claim—

The reversely-revolving knives or brushes F, arranged upon the reciprocating frame G and operating as described, in combination with the hide-carrying cylinder E and the driving mechanism, substantially as herein shown, and for the purpose set forth.

JOHN TURNEY.

Witnesses:
 HENRY E. HUNT,
  *Solicitor, Nottingham.*
 WILLM. HUNT.
  *Solicitor, Nottingham.*